(12) United States Patent
Herzog

(10) Patent No.: US 6,353,737 B1
(45) Date of Patent: Mar. 5, 2002

(54) TERMINAL AND AUTHORIZATION CARD FOR A SUBSCRIBER, TELECOMMUNICATIONS NETWORK, AND METHOD FOR MODIFYING A SERVICE PROFILE ASSIGNED TO THE SUBSCRIBER

(75) Inventor: Günther Herzog, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/128,874

(22) Filed: Aug. 4, 1998

(30) Foreign Application Priority Data

Aug. 9, 1997 (DE) .......................... 197 34 622

(51) Int. Cl.[7] .............................. H04B 7/00
(52) U.S. Cl. ...................... 455/418; 455/558
(58) Field of Search ................ 455/418, 419, 455/420, 422, 432, 433, 458, 466, 550, 551, 557, 558, 575

(56) References Cited

U.S. PATENT DOCUMENTS

| | | | |
|---|---|---|---|
| 5,335,276 A | | 8/1994 | Thompson et al. |
| 5,583,917 A | | 12/1996 | Jonsson |
| 5,881,235 A | * | 3/1999 | Mills .......................... 455/418 |
| 6,035,189 A | * | 3/2000 | Ali-Vehmas et al. ........ 455/418 |

FOREIGN PATENT DOCUMENTS

| | | |
|---|---|---|
| DE | 3428237 | 2/1986 |
| DE | 4118994 | 12/1992 |
| DE | 4242151 | 3/1994 |
| DE | 4406472 | 9/1995 |
| DE | 19513573 | 10/1996 |
| DE | 19618218 | 6/1997 |
| EP | 0562890 | 9/1993 |
| EP | 0654930 | 5/1995 |
| GB | 2256345 | 12/1992 |
| GB | 2315954 | 2/1998 |
| WO | 9307566 | 4/1993 |
| WO | 9722210 | 6/1997 |

OTHER PUBLICATIONS

"Removing the fixed Association between terminal and user—Personal Mobility in PCS" by Mohammed Zaid, IEEE Personal Communications, No. 4 Fourth Quarter, 1994, pp. 12–16.

Mobilfunk, Das Handbuch der mobilen Sprach–, Text– und Datenkommunikation, Stand 11/96 by Kedaj, et al, vol. 1, Chap. 4, pp. 3–10.

"Telefonkarte von der Zugangskontralle his zum Notizbuch from telekom aktuell", 1993 pp. 16–17.

"Personal Telephone Services Using IC–Cards" by Matsuo et al. Jul. 1989 IEEE Communications Magazine, pp. 41–48.

"Chip Cards (Memocards) and Telecommunications" article by Lissandrello in Multimil, Inc. literature. pp. 166–175.

Top page of Laser–Drucker Programmer–Handbuch of Kyocera Corporation.

(List continued on next page.)

*Primary Examiner*—Thanh Cong Le
(74) *Attorney, Agent, or Firm*—Ware, Fressola, Van Der Sluys & Adolphson LLP

(57) ABSTRACT

To be able to modify the service profile of a subscriber of a telecommunications network, a terminal (MS) is proposed having input and output means (KBD; LCD) as well as a processor ($\mu$P) connected thereto which accesses a data memory (MEM) which the subscriber can remove from the terminal and carry with him or her. The data memory is an erasable memory (MEM) which holds data for the service profile assigned to the subscriber. The processor ($\mu$P) controls the input and output means (KBD; LCD) so that the subscriber can have the service profile data output at the terminal and modify them. This reduces the signaling load on the link between the terminal and the telecommunications network. Preferred applications of the invention are in telecommunications networks using authorization cards (SIM), particularly mobile radio networks (MRN).

8 Claims, 2 Drawing Sheets

OTHER PUBLICATIONS

"Multimedium Chipkarte: Informationstrager, Sicherheitwerkzeug, Wertkarte" by Wolfenstetter in Telecom Praxis, Mar. 93, pp. 33–39.

"Die Chipkarte In Modernen Kommunikationssystemen" article by Effiung, pp. 451–464.

"Einstieg in den deutschen Mobilfunk–Markt" article in Funkshau Apr. 1992.

"Karten mit Gedachtnis" by Schrather in Telekommunikation, Funkschau, Jul. 1988 pp. 50–52.

* cited by examiner

TERMINAL AND AUTHORIZATION CARD FOR A SUBSCRIBER, TELECOMMUNICATIONS NETWORK, AND METHOD FOR MODIFYING A SERVICE PROFILE ASSIGNED TO THE SUBSCRIBER

TECHNICAL FIELD

This invention relates to a terminal for a subscriber of a telecommunications network having input and output means as well as a processor which accesses a data memory which the subscriber can remove from the terminal and carry with him or her. This invention also relates well as to an authorization card for the subscriber of such a telecommunications network, to a telecommunications network comprising such a terminal, and to a method of modifying a service profile assigned to such a subscriber.

BACKGROUND OF THE INVENTION

Patent Specification DE 42 42 151 discloses a terminal for a subscriber of a wireless telecommunications network, namely a mobile station for the subscriber of a mobile radio network. The terminal has input and output means, namely a keypad and a liquid crystal display. It further includes data processing means for processing authentication parameters which are stored on a so-called subscriber identity module. The subscriber identity module is a chip card with a data memory which is insertable into the terminal. This means that the terminal has a processor (data processing means) which accesses the data memory of the chip card. The data memory contains data (authentication parameters) which are verified during subscriber authentication. The terminal also has a transmit section which during mobile location registration, i.e., during call establishment, sends the data stored on the chip card to the telecommunications network (mobile radio network) for subscriber authentication. A check is then made to determine whether the subscriber is authorized to use the telecommunications network. Accordingly, the chip card may also be referred to as an authorization card. The terminal and the telecommunications network disclosed in DE 42 42 151 are based on the mobile radio standard "GSM" (Global System for Mobile Communications).

The GSM network is described by J. Kedaj and F. Joussen in the "Handbuch der mobilen Sprach-, Text-und Datenkommunikation", Vol. 1, Chap. 4. The handbook was published by the Neue Mediengesellschaft Ulm GmbH, Germany, under ISDN No. 3-923759-16-9. In the updated edition of November 1996, the structure of a service profile assigned to the subscriber is described in Vol. 1, Chap. 4, Section 4.1.5., pages 1–10. Accordingly, a service profile comprises the following types of services: telecommunications services, teleservices, bearer services, and supplementary services. As examples of teleservices, the transmission of speech (telephony), short messages, or facsimile messages is mentioned. Supplementary services are, for example, conference services, call forwarding, or the formation of closed user groups. On pages 31–50 of Section 4.1.5 it is described that the data for the service profile are stored in the so-called home location register. The home location register is a database within the mobile radio network and is managed by the service provider. Accordingly, the service profile can be modified only by the service provider. If the subscriber wants information on his or her service profile, he or she must seek such information from the service provider. In the GSM network, it is also possible to have individual service profile data, e.g., data about whether short message service has been activated, displayed at the terminal. These data must be transmitted from the home location register to the terminal, whereby the signaling load in the mobile radio network increases.

From DE-A-3428237 it is known that the subscriber can also be assigned a service profile in wireline telecommunications networks. DE-A-3428237 describes a wireline telecommunications network, namely an integrated services digital network (ISDN), in which the subscriber can use, besides the conventional telephone service, various communication services such as facsimile, telex, or videotex. A terminal is described into which different chip cards are insertable for upgrading the terminal to support the different communication services. The subscriber can have the available communication services displayed to him or her on a display of the terminal, i.e., the subscriber has access to information on his or her service profile. Each chip card makes possible a given communication service. It is also described that a chip card makes possible several communication services. Accordingly, DE-A-3428237 discloses a terminal which can be upgraded to support several communication services by insertion of at least one chip card. To accomplish this, however, the control software for implementing these communication services must be stored in the chip card itself. Therefore, the chip card must contain control data which must be transferred via the terminal to the telecommunications network, so that the communication services can be implemented. For the implementation of the communication services, the control data are commonly processed by the sequence control system in the exchange according to a predetermined protocol. The chip card thus contains data, namely the control data for the sequence control, which must be accessed by the telecommunications network several times. This results in a high signaling load on the link between the terminal and the telecommunications network, which slows down the implementation of the communication services.

SUMMARY OF THE INVENTION

It is an object of the invention to provide a terminal for a telecommunications network which permits simple access by the subscriber to information on his or her service profile and fast implementation of communication services.

Further, a telecommunications network equipped with such terminals, a subscriber authorization card for insertion into these terminals, and a method of modifying a service profile assigned to the subscriber are to be provided.

The object is attained by a terminal for a subscriber of a telecommunications network, having input and output means as well as a processor connected to the input and output means which accesses a data memory which the subscriber can remove from the terminal and carry with him or her, wherein the data memory is an erasable memory which holds data for a service profile assigned to the subscriber, and that the processor controls the input and output means in such a way that the subscriber can have the data for the service profile output to him or her and modify the data.

The object is also achieved by a telecommunications network comprising terminals for subscribers each having input and output means as well as a processor connected to the input and output means which accesses a data memory which the subscriber can remove from the terminal and carry with him or her, wherein the data memory is an erasable memory which holds data for a service profile assigned to the subscriber, and that the processor controls the input and output means in such a way that the subscriber can have the data for the service profile output to him or her and modify the data.

This object is still further achieved by an authorization card for a subscriber of a telecommunications network, for insertion into a terminal comprising a card reader, with a data memory disposed on the authorization card, which the subscriber can remove from the terminal and carry with him or her, and wherein the data memory is an erasable memory which holds modifiable data for a service profile assigned to the subscriber.

The object is also achieved by a method of modifying data for a service profile assigned to a subscriber of a telecommunications network wherein the subscriber operates a terminal having input and output means as well as a processor which accesses a data memory which the subscriber can remove from the terminal and carry with him or her, having the following steps: storing the data for the service profile in the data memory; by operating the input means, requesting the output of at least part of the data for the service profile; reading the requested data for the service profile from the data memory and outputting them on the output means; requesting the subscriber through the output means to specify the service profile data to be modified; sending the data to be modified to the telecommunications network; at least checking in the telecommunications network whether the modification of the service profile is technically feasible; if the modification is feasible, storing the modified data in a database of the telecommunications network and sending a confirmation of the modification to the terminal; and after receipt of the confirmation, writing the modified data into the data memory.

According to the invention, a terminal for a subscriber of a telecommunications network is provided having input and output means and a processor connected to these input and output means which accesses a data memory which the subscriber can remove from the terminal and carry with him or her. The data memory is an erasable memory which holds data for a service profile assigned to the subscriber. The processor controls the input and output means in such a way that the subscriber can modify the service profile data and have the service profile data output.

This enables the subscriber to interact with the terminal so as to retrieve information on his or her service profile and modify the service profile. The service profile data are stored in the data memory, which is inserted into the terminal. The control data for the sequence control, however, are stored in the terminal itself or preferably in the telecommunications network. This significantly reduces the signaling load on the link between the terminal and the telecommunications network.

The authorization card proposed is an authorization card for a subscriber of a telecommunications network which is designed to be inserted into a terminal having a card reader and contains a data memory, and which the subscriber can remove from the terminal and carry with him or her. The data memory is an erasable memory which holds modifiable data for a service profile assigned to the subscriber.

The telecommunications network proposed comprises the terminals according to the invention, i.e., subscriber terminals each having input and output means as well as a processor connected to these input and output means which accesses a data memory which the subscriber can remove from the terminal and carry with him or her. The data memory is an erasable memory which holds data for a service profile assigned to the subscriber, and the processor controls the input and output means so that the subscriber can modify the service profile data and have the service profile data displayed to him or her.

The proposed method is a method of modifying data for a service profile assigned to a subscriber of a telecommunications network wherein the subscriber operates a terminal having input and output means as well as a processor connected to these input and output means which accesses a data memory which the subscriber can remove from the terminal and carry with him or her. The method comprises the following steps: (1) storing the data for the service profile in the data memory; (2) by operating the input means, requesting the output of at least part of the data for the service profile; (3) reading the requested data for the service profile from the data memory and outputting the service profile data on the output means; (4) requesting the subscriber through the output means to specify the service profile data to be modified; (5) sending the data to be modified to the telecommunications network; (6) at least checking in the telecommunications network whether the modification of the service profile is technically feasible; (7) if the modification is feasible, storing the modified data in a database of the telecommunications network and sending a confirmation of the modification to the terminal; and (8) after receipt of the confirmation, writing the modified data into the data memory.

Particularly advantageously, the data memory is disposed on an authorization card on which the identity of the subscriber is stored, and the terminal includes a card reader which is connected to the processor and receives the authorization card for reading from and writing into the data memory, with the terminal preferably being a mobile station and the telecommunications network preferably being a mobile radio network. Thus, the subscriber only needs to insert his or her authorization card into the terminal to retrieve and modify his or her service profile. It is also particularly advantageous if the output means is a visual output means which displays the service profile data, or if the input and output means are voice input and voice output means, with the processor controlling a voice-controlled interrogation of the subscriber, asking for instructions for and modification of the service profile data. The subscriber thus can have the data either displayed to him or her or output in the form of speech as confirmation that the data have been modified.

The telecommunications network advantageously comprises at least one database in which copies of the service profile data stored in the data memories are stored. On the one hand, this is necessary to enable access by the service provider to the service profile, and on the other hand, the signaling load on the link between the terminal and the telecommunications network is thus further reduced. If the service provider modifies data of the service profile in the database of the telecommunications network, the data on the authorization card must also be modified. The database is preferably the so-called home location register.

BRIEF DESCRIPTION OF THE DRAWINGS

The invention will become more apparent from the following description of an embodiment taken in conjunction with the accompanying drawings, in which.

BEST MODE FOR CARRYING OUT THE INVENTION

Figure 1:
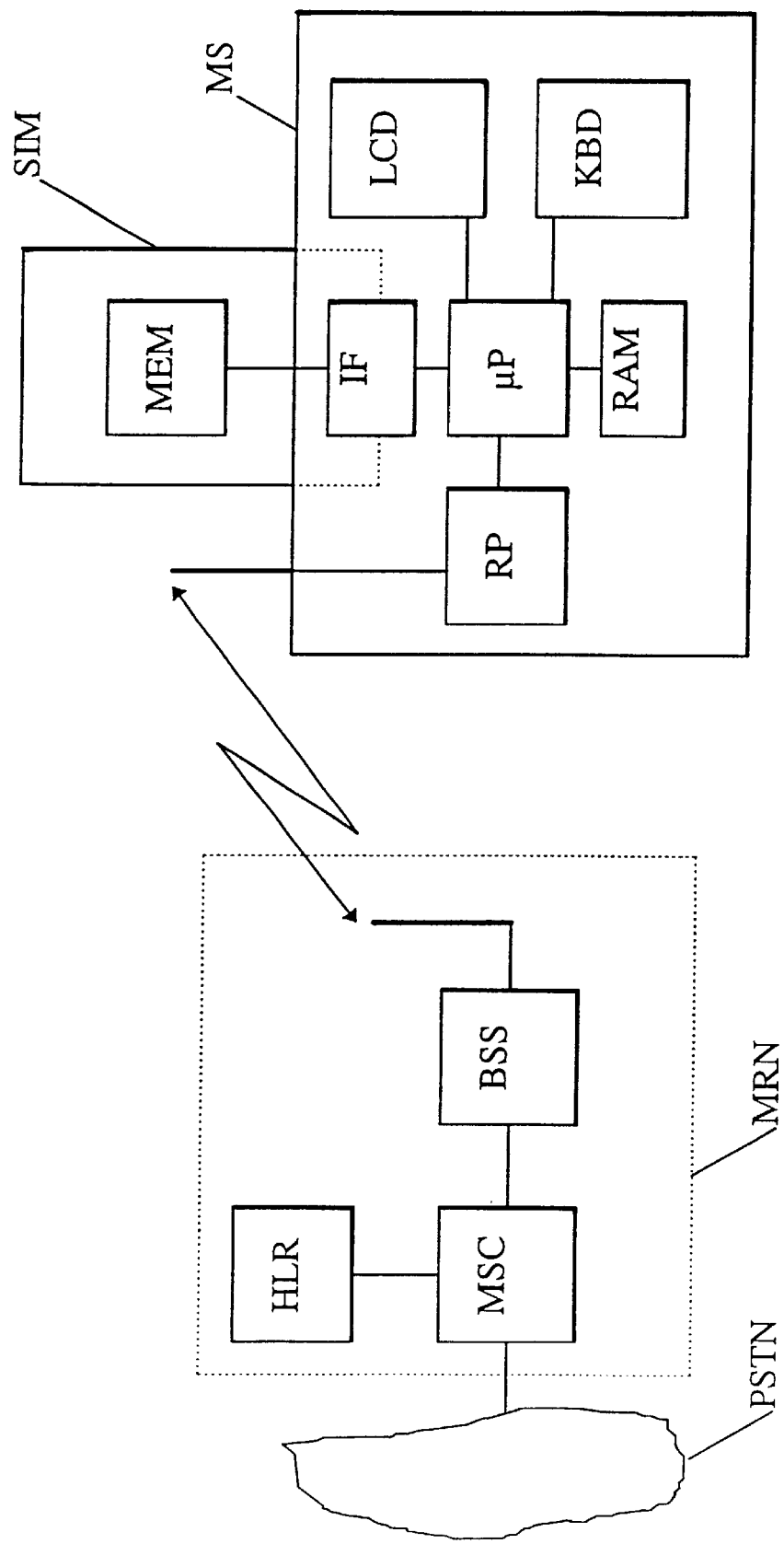
FIG. 1 is a schematic block diagram showing the structure of a telecommunications network and a terminal in accordance with the invention.

FIG. 1 shows schematically a telecommunications network, here a mobile radio network MRN, and a terminal, here a mobile station MS. The mobile radio network contains a mobile switching center MSC connected to a public telecommunications network PSTN, a database HLR connected to the mobile switching center, and a base station subsystem BSS connected to the mobile switching center. This base station subsystem consists essentially of a base station controller and several base stations connected thereto which serve one cell each. In the description of this example, only one cell will be considered; this means that only one antenna is shown schematically for the base station subsystem BSS of FIG. 1. Via this antenna, the mobile radio network MRN is in radio communication with the mobile station MS.

The mobile station MS contains essentially a radio communications unit RP, input and output means KBD and LCD, respectively, a card reader IF, and a processor $\mu$P with a random-access memory RAM. The mobile station is a digital radio unit in which the processor is connected to all the other components. The input and output means are, in this example, a keypad KBD and a liquid crystal display LCD. The card reader IF of the mobile station receives an authorization card SIM which contains a data memory MEM. The microprocessor $\mu$P can thus access the data stored in the data memory MEM.

The operation of the terminal MS of FIG. 1 and the exchange of data between the terminal and the telecommunications network MRN of FIG. 1 will now be described with the aid of FIG. 2.

Figure 2:
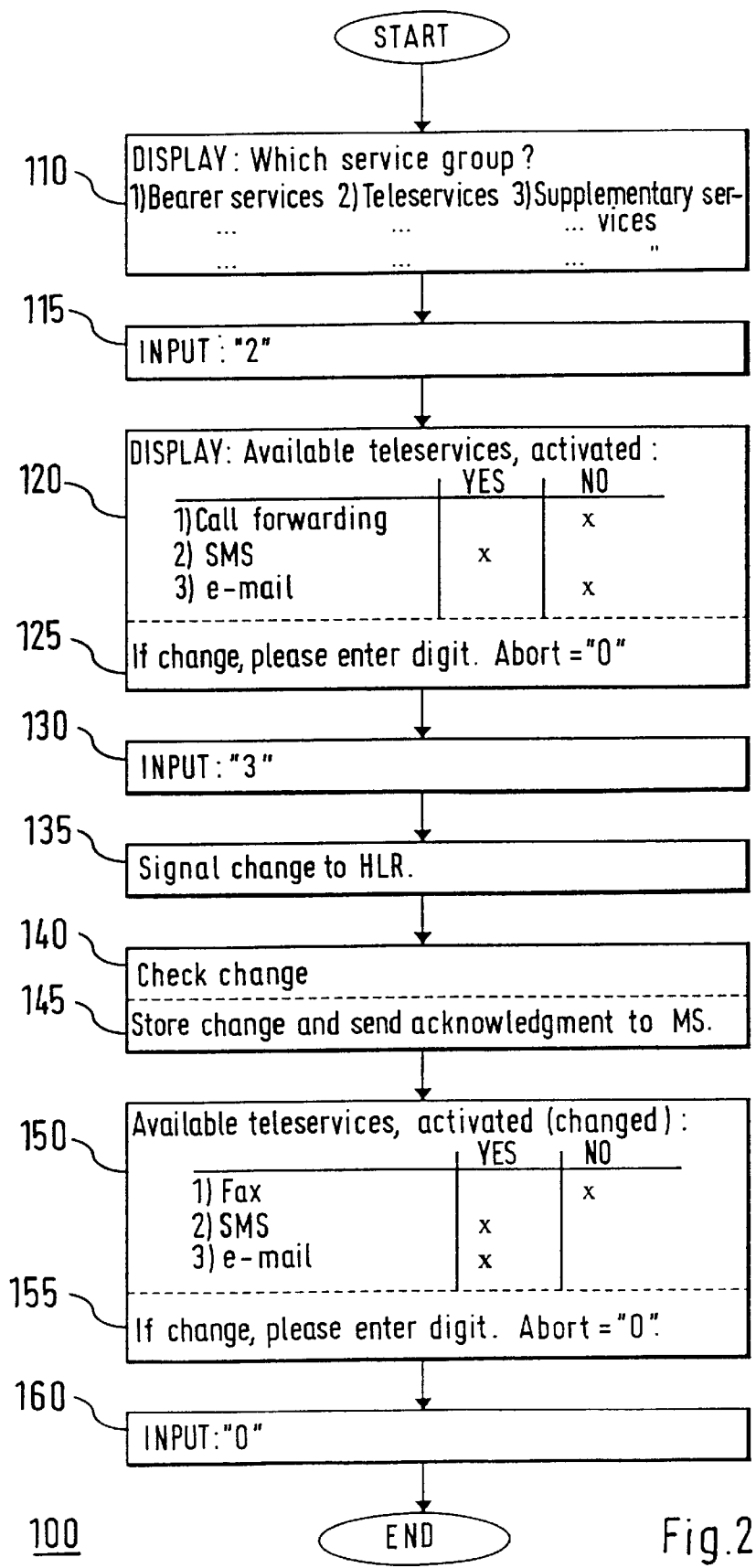
FIG. 2 is a flowchart showing the sequence of steps in the method according to the invention.

FIG. 2 is a flowchart showing the sequence of steps in the method according to the invention, 100, for modifying data stored in the data memory MEM. These data represent the service profile for the subscriber, i.e., they specify what telecommunications services the subscriber has subscribed to and which of them have been activated. These data correspond to an extract from the database HLR connected to the mobile switching center MSC (see FIG. 1). The subscriber can retrieve and modify these service profile data at the terminal without having to establish a connection to the telecommunications network (mobile radio network MRN).

For the retrieval of these data, in a first step 110, a display indicates to the user what groups of services he or she has subscribed to. In this example, the three groups of services mentioned by way of introduction, namely (1) bearer services, (2) teleservices, and (3) supplementary services, are displayed. These groups of services relate to service features such as mobility management, call handling, and service profile management. In a next step 115, the subscriber can select, by keyboard entry, on which group of services further data are to be displayed. In this example, the subscriber enters the digit "2" to obtain further data on the group "teleservices".

In a next step 120, these data are presented on the liquid crystal display. To this end, the microprocessor of the mobile station accesses the data memory of the authorization card and retrieves the required data from the data memory. In this example, the available teleservices are displayed, indicating whether the respective teleservice has been activated or not. The data of the service profile may also indicate with which setting the respective service has been activated. It may be indicated, for example, that the service "packet data transmission" has been activated with the setting "9.6 kb/s" transmission speed. As can be seen in FIG. 2, the subscriber has already activated the so-called short message service, SMS. The teleservices "call forwarding" and "e-mail" have not been activated yet.

In a further step 125, the subscriber is requested to change the indicated state, i.e., to activate or deactivate the teleservices. If the subscriber wants to change the state, he or she only needs to enter the digit assigned to the teleservice to be changed. In a next step 130, the subscriber enters, for example, the digit "3" to activate the teleservice "e-mail".

The above-described steps 110 to 130 are performed exclusively at the terminal, i.e., without participation of the telecommunications network. The subscriber can thus have the data of his or her service profile displayed to him or her at the terminal and change these data without having to access the telecommunications network, so that the signaling load on the link between the terminal and the telecommunications network is significantly reduced. If the subscriber has indicated in step 130 that he or she wants a datum of his or her service profile to be changed, a check is made in the subsequent steps to determine whether the change is technically feasible.

In a next step 135, the change is sent to the database HLR in the telecommunications network MRN. This measure requires only short-time signaling to the database. In a further step 140, the change is checked by the telecommunications network. In this example, a check is made to determine whether the teleservice "e-mail" can be activated for the subscriber or not: it must be determined by means of the database HLR whether the subscriber has subscribed to this teleservice and whether the radio link to the terminals and the terminal itself are designed for this teleservice. If the result of the check is positive, in a further step 145, the desired change is stored in the database of the telecommunications network and a confirmation is sent to the terminal. With that the desired change has been made, i.e., the teleservice "e-mail" has been activated.

In a further step 150, the subscriber is notified of this new status. The new status is shown on the display of the terminal, i.e., it is indicated that the teleservice "e-mail" has been activated, too. In a subsequent step 155, the subscriber is requested to change this state if desired.

In a last step 160, the subscriber, in this example, enters the digit "0" to indicate that he or she does not want a change and would like to abort the process. With the end of the procedure described with reference to FIG. 2, the change in the service profile of the subscriber has been completed.

The flowchart of FIG. 2 illustrates only one embodiment of the method according to the invention. From the description of this method 100 it is apparent that, according to the invention, the subscriber can have his or her service profile data displayed to him or her at the terminal and can change this data at the terminal. It is not until the desired change is to take effect that signaling takes place from the terminal to the telecommunications network. For the sequence control of the service, the database of the telecommunications network, not the data memory in the terminal, is then accessed. Accordingly, only short-time signalifrom the terminal to the telecommunications network is necessary, namely when the desired change in the service profile is to be checked by the telecommunications network.

The invention is applicable to both wireless telecommunications, such as the GSM or DECT mobile radio systems, and wireline telecommunications, such as the ISDN. The invention can be used with particular advantage in those networks where the subscriber carries an authorization card with him or her. Such networks are also referred to as UPT (Universal Personal Telecommunications) networks. One example of such a network is the Universal Mobile Telecommunications System (UMTS), which will provide wireless access to services anywhere and independently of the system technology used.

What is claimed is:

1. A terminal (MS) for a subscriber of a telecommunications network (MRN), having voice input and output means as well as a processor ($\mu$P) connected to said input and output means which accesses a data memory (MEM) which the subscriber can remove from the terminal and carry with him or her, wherein the data memory is an erasable memory (MEM) which holds data for a service profile assigned to the subscriber, and the processor ($\mu$P) controls the voice input and output means to accent voice instructions from the subscriber for entry of service profile data, to provide voice interrogation of the subscriber, asking for said voice instructions, and to provide voice confirmation when the data have been modified.

2. A terminal (MS) as claimed in claim 1, characterized in that the data memory (MEM) is disposed on an authorization card (SIM) on which the subscriber's identity is stored, and that the terminal (MS) further comprises a card reader (IF) connected to the processor ($\mu$P), said card reader (IF) receiving the authorization card (SIM) for reading from and writing into the data memory (MEM).

3. A terminal (MS) as claimed in claim 2, characterized in that the terminal is a mobile station (MS), and that the telecommunications network is a mobile radio network (MRN).

4. A terminal (MS) as claimed in claim 1, characterized in that the data for the service profile indicate what telecommunication services the subscriber has subscribed to and which of them have been activated.

5. A terminal (MS) as claimed in claim 1, characterized in that the output means is a visual output means (LCD) which displays the data for the service profile.

6. A telecommunications network (MRN) comprising terminals (MS) for subscribers, each terminal having voice input and output means (KBD; LCD) as well as a processor ($\mu$P) connected to said voice input and output means which accesses a data memory (MEM) which the subscriber can remove from the terminal (MS) and carry with him or her, wherein the data memory is an erasable memory (MEM) which holds data for a service profile assigned to the subscriber, and the processor ($\mu$P) controls the voice input and output means to accept voice instructions from the subscriber for entry of service profile data, to provide voice interrogation of the subscriber, asking for said voice instructions, and to provide voice confirmation when the data have been modified.

7. A telecommunications network (MRN) as claimed in claim 6, characterized by further comprising at least one database (HLR) which contains copies of the service profile data stored in the data memories (MEM).

8. A method (110) of modifying data for a service profile assigned to a subscriber of a telecommunications network (MRN) wherein the subscriber operates a terminal (MS) having input and output means (KBD; LCD) as well as a processor ($\mu$P) which accesses a data memory (MEM) which the subscriber can remove from the terminal (MS) and carry with him or her, characterized by the following steps:

storing the data for the service profile in the data memory;

by operating the input means (KBD), requesting the output of at least part of the data for the service profile (step 115);

reading the requested data for the service profile from the data memory (MEM) and outputting the requested data on the output means (LCD) (step 120);

requesting the subscriber through the output means (LCD) to specify the service profile data to be modified (step 125);

sending the service profile data to be modified to the telecommunications network (step 135);

at least checking in the telecommunications network whether the modification of the service profile data is technically feasible (step 140);

if the modification is feasible, storing the modified service profile data in a database of the telecommunications network and sending a confirmation of the modification of the service profile data to the terminal (step 145); and after receipt of the confirmation, writing the modified service profile data into the data memory (MEM) (step 150).

* * * * *

UNITED STATES PATENT AND TRADEMARK OFFICE
CERTIFICATE OF CORRECTION

PATENT NO.  : 6,353,737 B1
DATED       : March 5, 2002
INVENTOR(S) : Herzog

It is certified that error appears in the above-identified patent and that said Letters Patent is hereby corrected as shown below:

Column 7,
Line 18, "accent" should be -- accept --.

Signed and Sealed this

Twenty-fifth Day of June, 2002

Attest:

JAMES E. ROGAN
Attesting Officer     Director of the United States Patent and Trademark Office